United States Patent
Xing (10) Patent No.: US 12,242,875 B2
(45) Date of Patent: Mar. 4, 2025

(54) MULTIPLE SECURE VIRTUAL PROCESSORS FOR A TRUST DOMAIN

(71) Applicant: Intel Corporation, Santa Clara, CA (US)

(72) Inventor: Bin Xing, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 503 days.

(21) Appl. No.: 17/484,825

(22) Filed: Sep. 24, 2021

(65) Prior Publication Data
US 2022/0012086 A1    Jan. 13, 2022

(51) Int. Cl.
G06F 9/455 (2018.01)
G06F 12/14 (2006.01)

(52) U.S. Cl.
CPC ...... *G06F 9/45558* (2013.01); *G06F 9/45545* (2013.01); *G06F 12/1441* (2013.01); *G06F 12/1458* (2013.01); *G06F 2009/45587* (2013.01); *G06F 2009/45595* (2013.01)

(58) Field of Classification Search
CPC ............ G06F 9/45558; G06F 9/45545; G06F 12/1441; G06F 12/1458; G06F 2009/45587; G06F 2009/45595
See application file for complete search history.

(56) References Cited

U.S. PATENT DOCUMENTS

| | | | |
|---|---|---|---|
| 2016/0188492 A1* | 6/2016 | Bachwani | G06F 12/14 711/6 |
| 2019/0042463 A1* | 2/2019 | Shanbhogue | G06F 9/30145 |
| 2020/0057664 A1* | 2/2020 | Durham | G06F 21/53 |

OTHER PUBLICATIONS

"Architecture Specification: Intel Trust Domain Extensions (Intel TDX) Module", REd. #344425-003US, Aug. 2021, 304 pages.
"Intel Trust Domain CPU Architectural Extensions", Ref. #343754-002 US May 2021, 40 pages.
White Paper, "Intel Trust Domain Extensions", Ref. #343961-002US, Sep. 2020, 9 pages.

* cited by examiner

*Primary Examiner* — Dong U Kim
(74) *Attorney, Agent, or Firm* — JAFFERY WATSON HAMILTON & DESANCTIS LLP (57) ABSTRACT

Providing multiple virtual processors (VPs) for a trusted domain (TD) includes creating a virtual processor control structure (VPCS) for one or more of a plurality of VPs of the TD of a processor in a computing system, the TD including a trust domain control structure (TDCS), the plurality of VPs having views into addresses of private memory of the TD, the VPCS for a VP including a secure extended page table (SEPT) for the VP; and for the VP, initializing the VPCS for the VP by copying selected entries of the TDCS to the SEPT of the VPCS, pointing a SEPT pointer to the VPCS, and setting an entry point for starting execution of the VP by the processor.

13 Claims, 5 Drawing Sheets

MULTIPLE SECURE VIRTUAL PROCESSORS FOR A TRUST DOMAIN

FIELD

Embodiments relate generally to computer security, and more particularly, to providing multiple secure virtual processors for a trust domain in computing systems.

BACKGROUND

Some computing systems include architectural elements to deploy hardware isolated virtual machines (VMs). In some computing systems these hardware isolated VMs are called encrypted virtual machines (EVMs). An implementation of an EVM is provided by Trust Domain Extensions (TDX), a security feature of some processors available from Intel Corporation that introduce architectural elements to deploy hardware-isolated virtual machines. Intel® TDX removes the host virtual machine manager (VMM) from the trusted computing bases (TCBs) of VMs and protects the confidentiality and integrity of the processor context, memory, and other metadata (e.g., static/runtime measurement, etc.) of VMs. A VM protected by TDX is usually referred to a trust domain (TD).

A TD has two classes of memory: private memory that holds confidential data of the TD, and shared memory used to communicate with untrusted entities external to the TD. The VMM helps allocate and map memory used by a TD into guest physical addresses (GPAs) of the TD using an extended page table (EPT) that provides GPA to physical address (PA) translations. When a TD is executing, the computing system designates that two EPTs are active for the TD: a shared EPT used to provide shared GPA to PA translations (for the shared memory) and a secure EPT used to provide private GPA to PA translations (for the private memory).

There is a need to execute software in a computing system that is shielded from a TD yet retains the ability to access the TD's memory, state, and/or metadata. For example, virtual trusted platform module (vTPM) platform configuration registers (PCRs) could be implemented inside a TD, but attestation keys (AIKs) of a vTPM must be protected, otherwise a compromised TD could compromise the AIKs to sign arbitrary PCR values. In some computing systems, a TPM is a secure physical co-processor. However, it is desirable to provide secure virtual processors in a TD of a computing system.

BRIEF DESCRIPTION OF THE DRAWINGS

So that the manner in which the above recited features of the present embodiments can be understood in detail, a more particular description of the embodiments, briefly summarized above, may be had by reference to embodiments, some of which are illustrated in the appended drawings. It is to be noted, however, that the appended drawings illustrate only typical embodiments and are therefore not to be considered limiting of its scope. The figures are not to scale. In general, the same reference numbers will be used throughout the drawings and accompanying written description to refer to the same or like parts.

DETAILED DESCRIPTION

Implementations of the technology described herein include a method and system that provides multiple secure virtual processors in a TD of a computing system. In an embodiment, the multiple secure virtual processors (VPs) are part of a TD and VPs have views into TD memory by means of a plurality of secure extended page tables (SEPTs). In existing computing systems, there is only one SEPT for each TD, so all VPs in the TD see the same guest physical range of TD memory. In an embodiment, there are multiple SEPTs for each TD. In an example, each VP uses its own SEPT (e.g., a 1:1 mapping). In another example, two or more VPs share a SEPT (e.g., N:1 mapping, where N is a natural number of VPs). By providing per-VP SEPT access, each VP may see a different view of TD memory, and this allows a VP to process data that other VPs in the TD do not have access to. In an embodiment, two or more VPs may share a same view of private memory of a TD, have overlapping views, or have non-overlapping views.

Embodiments reduce complexity and improves performance for TDs in computing systems because data exchange between a virtual processor and virtual co-processors can be done simply in private memory of a TD that is shared between VPs, without the need for networking and encryption. For example, if two VPs have different views of TD memory, then each VP can have its own "VP private" memory in TD private memory not visible to the other VP, yet the VPs can communicate through TD private memory that both have access to. For existing technology based on service TDs, embodiments allow moving service TD processing into VPs, which gives cloud service providers (CSPs) greater flexibility and simplifies attestation/verification processing.

In an embodiment, an EVM is implemented as a trust domain (TD) that is a hardware isolated virtual machine (VM) deployed using Intel® Trust Domain Extensions (TDX). TDs and Intel® TDX are described in Architecture Specification: Intel® Trust Domain Extensions (Intel® TDX) Module, August 2021, and later versions, and Intel® Trust Domain Architectural Extensions, May 2021, and later versions.

A TD is logically comprised of three parts: a TD control structure (TDCS), TD memory, and a plurality of VPs. The TDCS is created first when creating a TD. The TDCS is used by a secure arbitration module (TDX SEAM) to manage a TD. In an embodiment, the TDCS consists of multiple 4 KB pages. Pages of TD memory are then added to the TD. In existing computing systems, a TD has only one SEPT, whose top-level page (containing 512 top-level entries) resides in the TDCS. Lower-level SEPT pages are added to the SEPT as needed. Next, VPs are added to the TD. A VP in Intel® TDX is similar to a virtual machine control structure (VMCS) in the case of Virtual Machine eXtensions (VMX). Each VP has an SEPT pointer. In existing computing systems, all VPs have their SEPT pointers pointing to the same SEPT (e.g., the top-level SEPT page, which is part of the TDCS).

In embodiments, multiple SEPTS are provided for a TD. In an embodiment, an Intel® TDX module helps provide SEPT management functions to a VMM to add or remove mappings from the SEPTs and enforce security policies around those operations with the aim of preserving the integrity of the memory layout. The memory used to build the SEPTs is designed to be encrypted and integrity-protected using a unique, per-TD, memory encryption key. A processor of the computing system helps prevent a TD from locating page table structures and executable code in shared memory. The processor causes a page fault on code fetches or page table accesses if they are in shared memory. Thus, page tables and SEPTs are stored in memory that only TDX SEAM can access.

Figure 1:
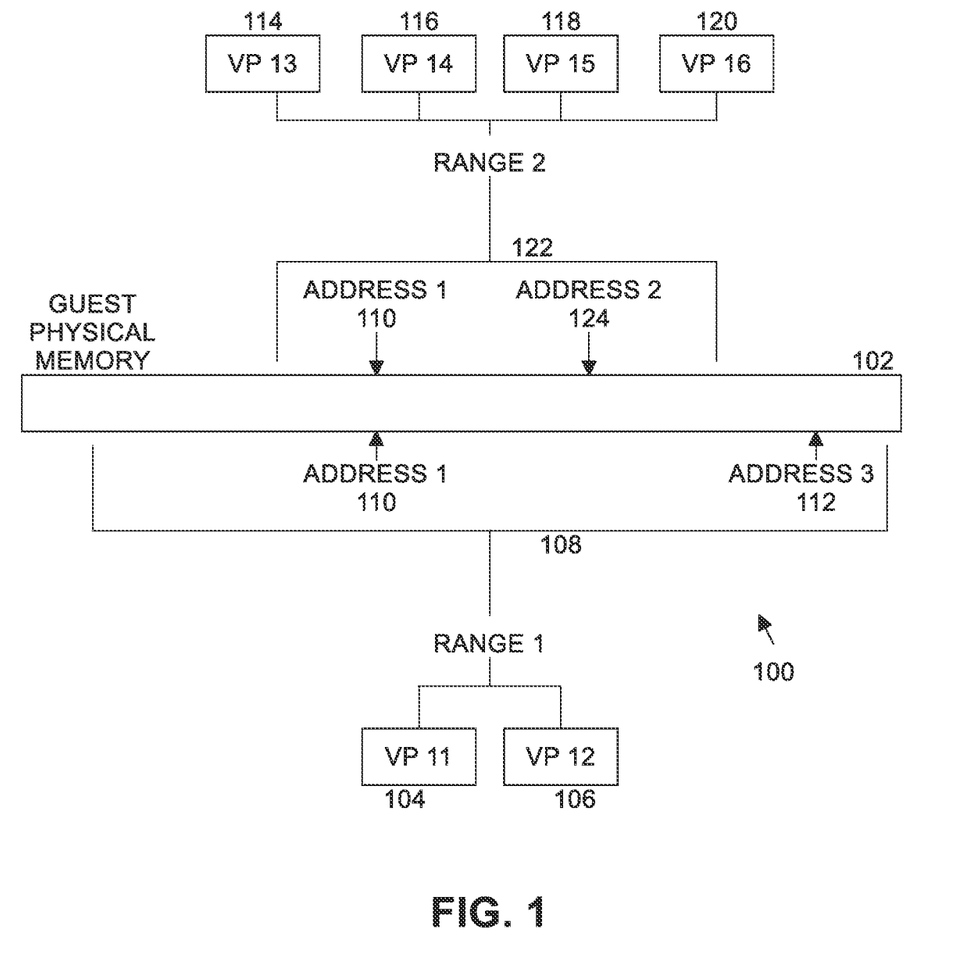
FIG. 1 is a diagram of a computing arrangement of multiple secure virtual processors according to some embodiments.

FIG. 1 is a diagram of a computing arrangement 100 of multiple secure virtual processors according to some embodiments. Physical memory 102 may be addressed and accessed by multiple VPs. Each VP has a view into a range of addresses in guest physical address space assigned to the TD. These views may overlap and may be shared among VPs. For example, VP 11 104 and VP 12 106 may be able to access range 1 108 of addresses to guest physical memory 102. VP 11 104 and VP 12 106 may access physical memory at address 1 110 and/or at address 3 112 since these addresses are in range 1 108. For example, VP 13 114, VP 14 116, VP 15 118, and VP 16 120 may be able to access range 2 122 of address to physical memory 102. VP 13 114, VP 14 116, VP 15 118, and VP 16 120 may access physical memory at address 1 110 and address 2 124 since these addresses are in range 2 122. In embodiments, there may be any number of ranges, two or more of the ranges may be identical, two or more of the ranges may overlap, and two or more of the ranges may not overlap. Note that an address, such as address 1 110 may be accessed by VPs from two or more ranges.

Figure 2:
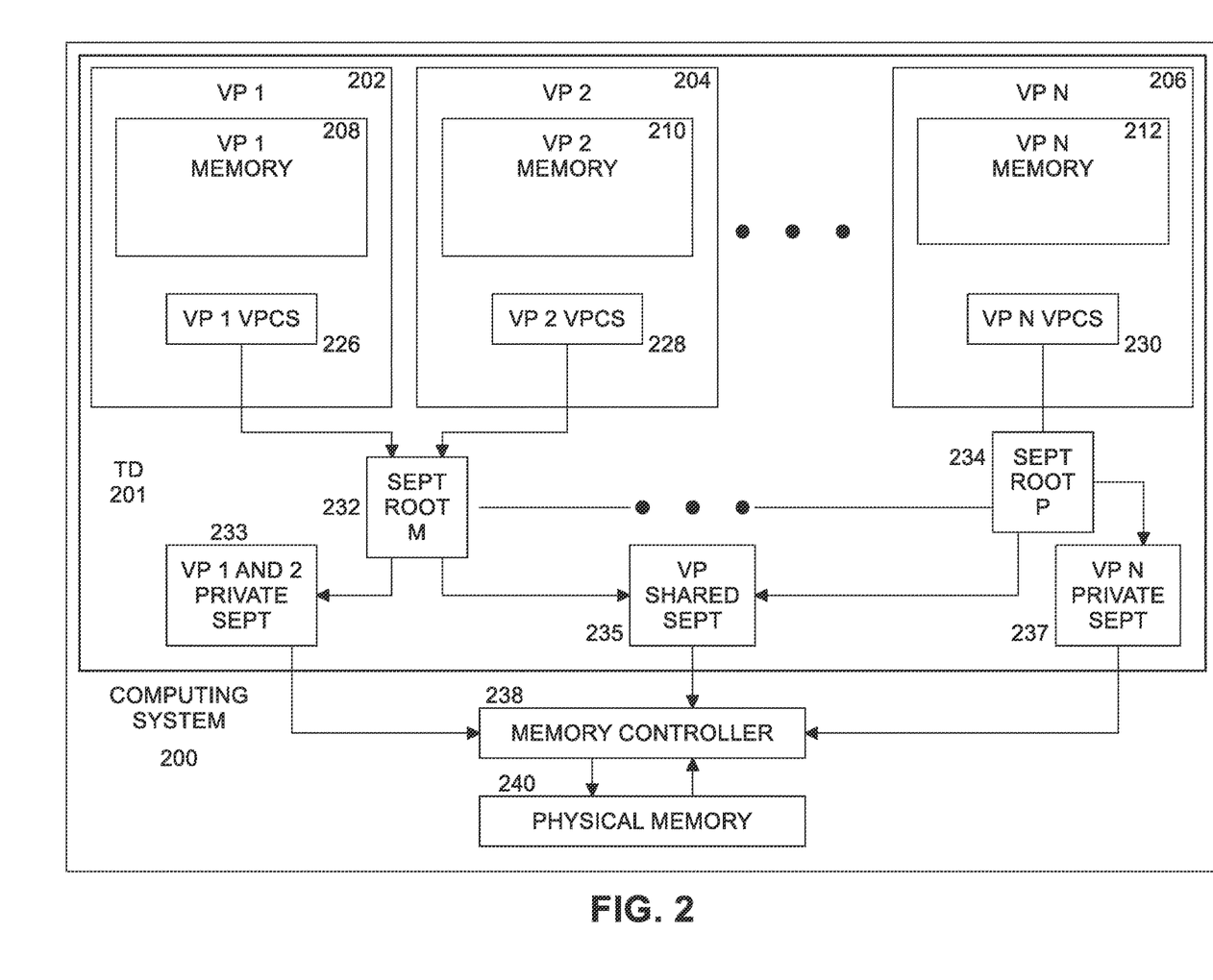
FIG. 2 is a diagram of a computing system having multiple secure virtual processors according to some embodiments.

Managing multiple ranges of addresses accessible by multiple VPs is handled by multiple SEPTs. FIG. 2 is a diagram of a computing system 200 having multiple secure virtual processors according to some embodiments. Computing system 200 includes memory controller 238 interfacing to physical memory 240. At least a portion of physical memory 240 is allocated for private memory for TD 201. Computing system 200 includes at least one TD 201 and two or more SEPT roots (e.g., SEPT root M 232 . . . SEPT root P 234). As used herein, an SEPT root is a to-level entry in a SEPT. SEPT roots access a shared SEPT 235 containing lower level EPT pages shared by the VPs. TD 201 includes multiple VPs, shown here as VP 1 202, VP 2 204, . . . VP N 206, where N is a natural number. Each VP includes logical private memory and a virtual processor control structure (VPCS). For example, VP 1 202 includes VP 1 memory 208 and VP 1 VPCS 226, VP 2 204 includes VP 2 memory 210 and VP 2 VPCS 228, . . . VP N 206 includes VP N memory 212 and VP N VPCS 230.

Each VP includes a VPCS (similar in usage to a VMCS in VMX). The VPCS contains the processor context (e.g., values of registers) to be loaded when a VP is launched. When a VP is interrupted, the processor context is written back to the VPCS before control is handed back to TDX-SEAM.

Each private memory in a VP is mapped to an area of physical memory 240 through memory controller 238 by a VPCS for the VP and a SEPT. The SEPT is used to translate a private GPA (e.g., a GPA accessing private memory for the TD) into a physical address and a private key identifier (ID) for the TD. For example, VP 1 202 maps GPAs in VP 1 memory 208 to physical addresses in physical memory 240 using SEPT root M 232 as pointed to by VP 1 VPCS 226, VP 2 204 maps GPAs in VP 2 memory 210 to physical addresses in physical memory 240 using SEPT root M 232 as pointed to by VP 2 VPCS 228, . . . VP N 206 maps GPAs in VP N memory 212 to physical addresses in physical memory 240 using SEPT root P 234 as pointed to by VP N VPCS 230. Note that one of the multiple SEPTs for the TD may be used by only one VP, or one of the multiple SEPTs for the TD may be used by multiple VPs (e.g., the SEPT is shared). The SEPT of each VP resides in memory that is accessible to TDX SEAM only. Even though a SEPT may be shared among VPs of the same TD, the SEPT is not accessible to the host or other TDs.

Each TD 201 includes a TD control structure (TDCS). The TDCS contains information about a TD known by TDX SEAM. Examples include a key ID assigned to the TD, the memory encryption key, the hash of the TD's initial memory content, the signing public key, hardware features needed/enabled, etc. The TDCS also contains the root SEPT page.

In an embodiment, a SEPT root may point to a private SEPT and zero or more shared SEPTs. For example, SEPT root M 232 which is shared by VP 1 202 (via VP1 VPCS 226) and VP 2 204 (via VP 2 VPCS 228) points to VP 1 and VP 2 private SEPT 233, as well as VP shared SEPT 235. For example, SEPT root P 234 points to VP N private SEPT 237 and VP shared SEPT 235.

There are multiple possible approaches for implementing support for multiple SEPTs. To increase security, it is preferred to not create aliases for any pages. An alias is when the same page is mapped to different GPAs depending on which SEPT the page is accessed through. Moreover, GPA space on 64-bit processors is generally considered very large by most application programs today, so rather than creating multiple GPA spaces, it is simpler to limit the ranges of GPAs that a VP can access.

In an embodiment, the following changes to the existing Intel® TDX architecture are made for each VP. First, the VPCS for a VP is extended to include a top-level (root) page of the VP's SEPT. Second, during VP initialization, instead of pointing the VP's SEPT pointer to the SEPT table in TDCS, initialization processing copies selected (by the bit mask) entries from the SEPT of the TDCS to the VP's SEPT in the VPCS. The bitmask (along with the VP's index) must be measured. Third, given a default entry point "0xFFFFFFF0" may be inaccessible to this VP, a custom entry point is allowed and measured. To support an entry point above 4 GB, in an embodiment the VP must start in 64-bit mode. This may be done by supplying a page table of identity mapping by the secure arbitration module (SEAM) of TDX (TDX-SEAM). For attestation purposes in response to a reporting instruction, a 256-bit field is added to the report showing which GPA ranges the reporting VP has access to. This helps remote parties to tell whether a report was created by the main processor or one of the co-processors. Attempts by the VP to accept TD memory (e.g., through a TDX SEAM API) cannot accept pages whose GPAs are inaccessible from the calling VP. In practice, this requires no change in the implementation because the SEPT walk would fail and cause the attempt to abort naturally.

Figure 3:
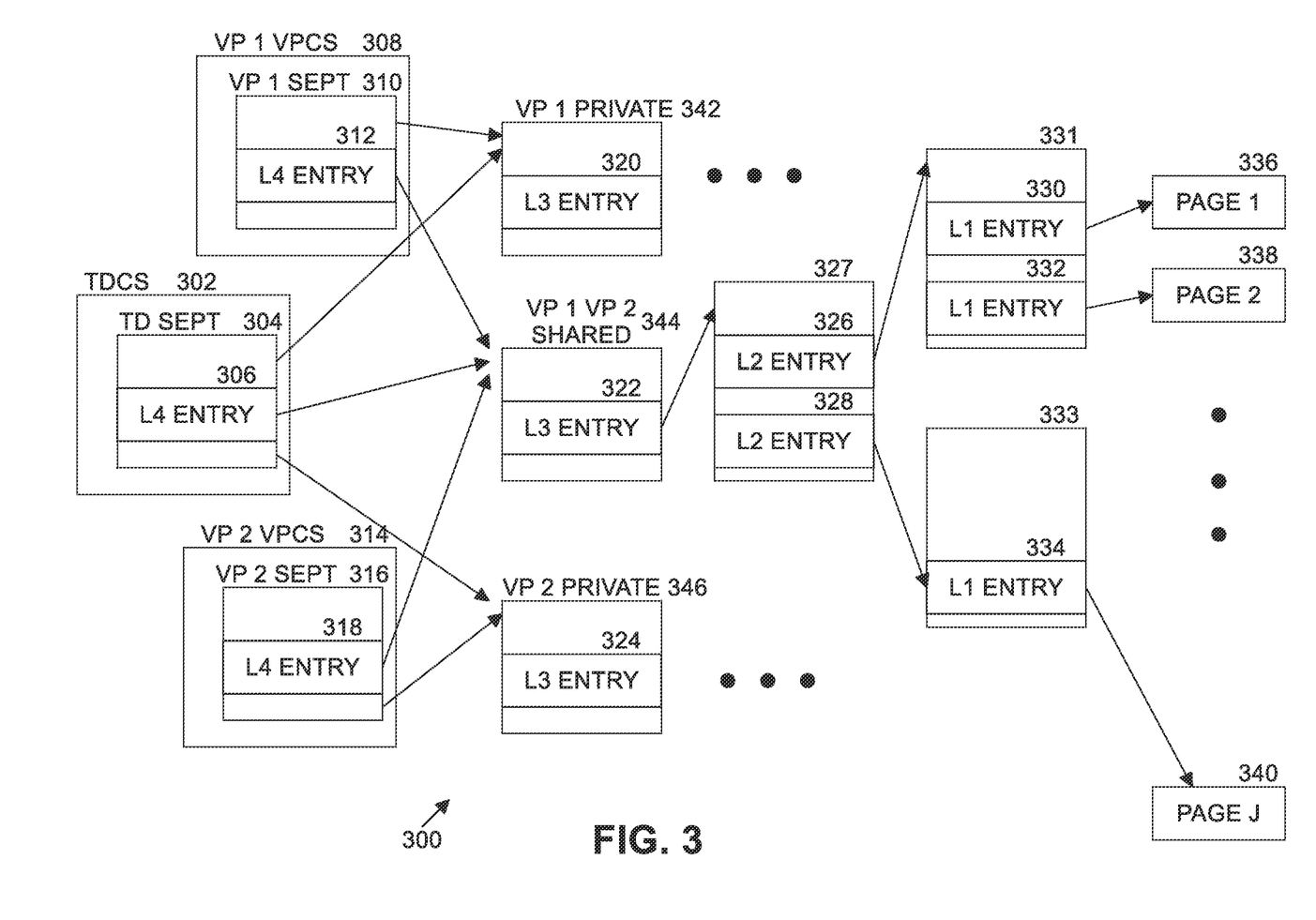
FIG. 3 is a diagram of a trust domain control structure and one or more virtual processor control structures according to some embodiments.

FIG. 3 is a diagram 300 of a trust domain control structure (TDCS) and one or more virtual processor control structures (VPCSs) according to some embodiments. FIG. 3 illustrates a portion of the example of FIG. 2. TDCS 302 for TD 201 includes TD SEPT 304, which operates as the root EPT for the TD. In an embodiment, TD SEPT comprises 512 entries of physical addresses of next level entries, and each level includes 512 entries of physical addresses of next level entries. In the example, Level 4 (L4) entry 306 is shared by VP 1 202 and VP 2 204. Thus, the L4 entry 306 is copied into VP 1 SEPT 310 of VPCS 308 as L4 entry 312, and the L4 entry 306 is copied into VP 2 SEPT 316 of VPCS 314 as L4 entry 318. L4 entry 306 of TD SEPT 306 points to VP 1 VP2 shared entries 344, and other entries of TD SEPT 304 point to VP 1 private entries 342 and VP 2 private entries 346. The copied L4 entries 312, 318 also point to VP 1 VP 2 shared entries 344. L3 entries in VP 1 private entries 342 point to a range of addresses private to VP 1 202. L3 entries VP 2 private entries 346 point to a range of addresses private to VP 2 204. For example, L3 entry 322 of VP 1 VP 2 shared entries 344 points to L2 entries 327. L2 entries 327 includes L2 entry 326 pointing to L1 entries 331 and L2 entry 328 pointing to L1 entries 333. L1 entry 330 points to page 1 336, L1 entry 332 points to page 2 338, and L1 entry 334 points to page J 340.

Figure 4:
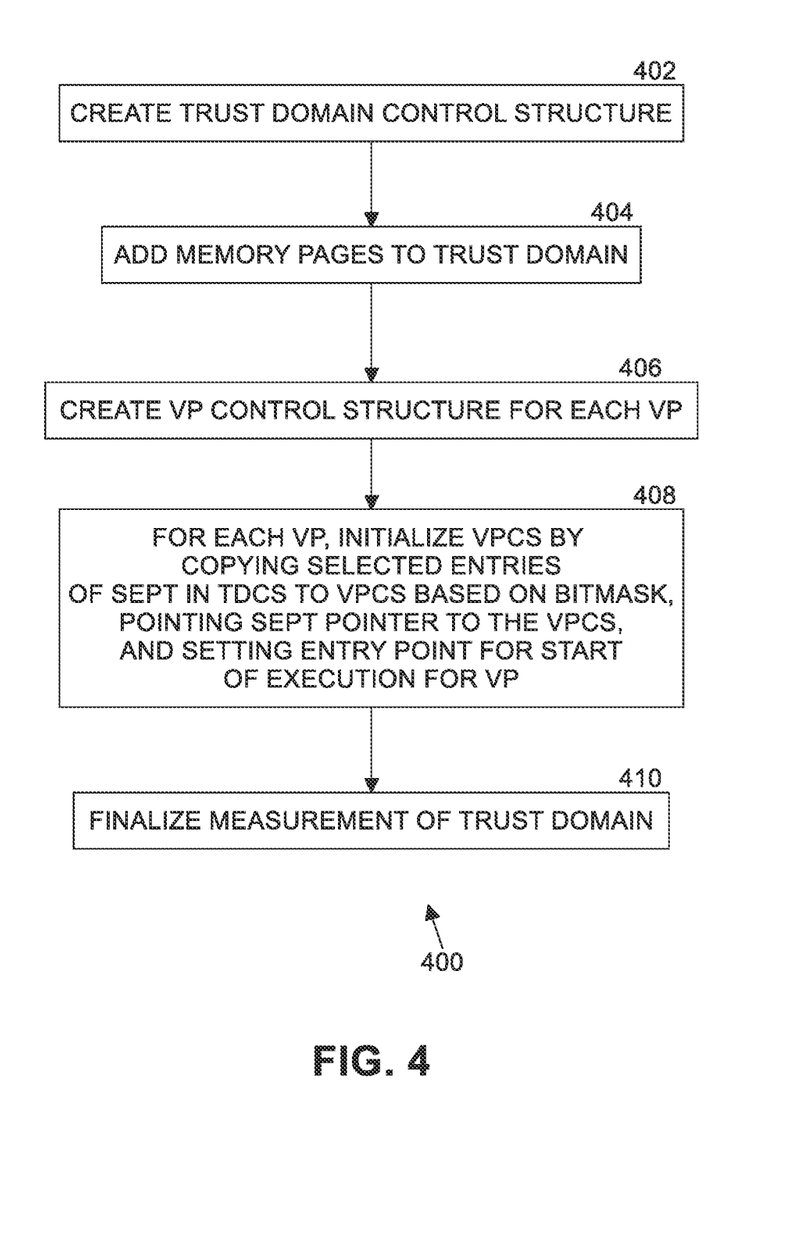
FIG. 4 is a flow diagram of initialization processing for multiple secure virtual processors according to some embodiments.

FIG. 4 is a flow diagram of initialization processing 400 for multiple secure virtual processors according to some embodiments.

At block 402, a trust domain control structure is created for a TD. In an embodiment, the TDCS is created by a VMM by allocating pages and passing their addresses to TDX SEAM. TDX SEAM responds by initializing the TDCS pages. In an embodiment, the first page of TDCS is called TD root (TDR), which is created by an application programming interface (API) of TDX SEAM. The address of the TDCS serves as the ID of the TD in subsequent SEAM API calls. Pages are then added to the TDCS. In an embodiment, these pages are called TDCX pages. The fully allocated TDCS (comprised of one TDR and multiple TDCX pages) is initialized.

At block 404, memory pages are added to the TD. As part of adding memory pages, lower SEPT pages and leaf entries are added as needed. As part of the adding operation, the initial memory contents of a TD are loaded and optionally measured. For each page added to the TD, the invocation of the API to add the memory page is measured to a measurement of the TD (MRTD) MRTD, which is a SHA-384 hash in one embodiment. As used herein to "measure" simply means updating a hash (with the data being measured as input to the update function). MRTD is initialized at the same time as TDCS is initialized, then updated for each page added. Optionally, VMM could request to measure (that is, to update MRTD with) the contents of the added page.

A page can be added only if an entry in the TD's SEPT is available. SEPT entries must be created before pages can be added. The contents of each added page are optionally measured.

At block 406, a VP control structure (VPCS) is created for each VP. The VPCS captures the processor context for the VP. In an embodiment, the VPCS spans across multiple 4 KB pages. First, a VP root (VPR) page is created. The address of the VPR page serves as the ID of the VP in subsequent TDX SEAM calls. Next, additional pages (e.g., the rest of the VPCS pages) are added to the VPCS (by referencing the VPR page when calling the corresponding TDX SEAM APIs).

At block 408, the fully allocated VPCS for each VP is initialized. Before this operation, there's only one SEPT for the TD. This operation effectively "clones" then "customizes" per-VP SEPTs. For each VP, the VPCS is initialized by copying selected entries of the SEPT for TDCS to the VPCS based on a bitmask, pointing the SEPT pointer for this VP to this VPCS, and setting the entry point for start of execution for this VP. In an embodiment, the bitmask comprises 256 bits indicating which top-level entries of the SEPT are accessible to this VP. The bitmask parameter is measured and may be attested to by a reporting instruction. In an embodiment, the entry point is the initial % rip (64-bit register instruction pointer) when the VP is first entered. In an embodiment, this may be hard coded to 0xFFFFFFF0, but depending on the bitmask, the VP may not have access to this location, so a custom % rip is allowed. The entry point is measured.

At block 410, the measurements for the TD are finalized using a hash function. A hash process may be comprised of an internal state and three operations, usually referred to as Initialize( ), Update(data), and Final( ). For the Initialize operation, the internal state is initialized to constants stipulated by the hash process specification. Each hash process has an internal state of fixed size (e.g., SHA-256 has an internal state of 256 bits; while SHA-3 has an internal state of 1600 bits). For the Update operation, this is the actual hash process, which takes the internal state and the user supplied data as input, and outputs the updated internal state. Note that a hash process usually takes data in chunks of fixed size (e.g., SHA-256 processes 512-bit chunk at a time). This operation may be performed as many times as needed to process all user data. For the Final operation, the remaining user data (smaller than a chunk) is padded to chunk size, then serves as input to Update( ). The output value will be the final hash value. Different hash processes implement their own padding schemes.

Figure 5:
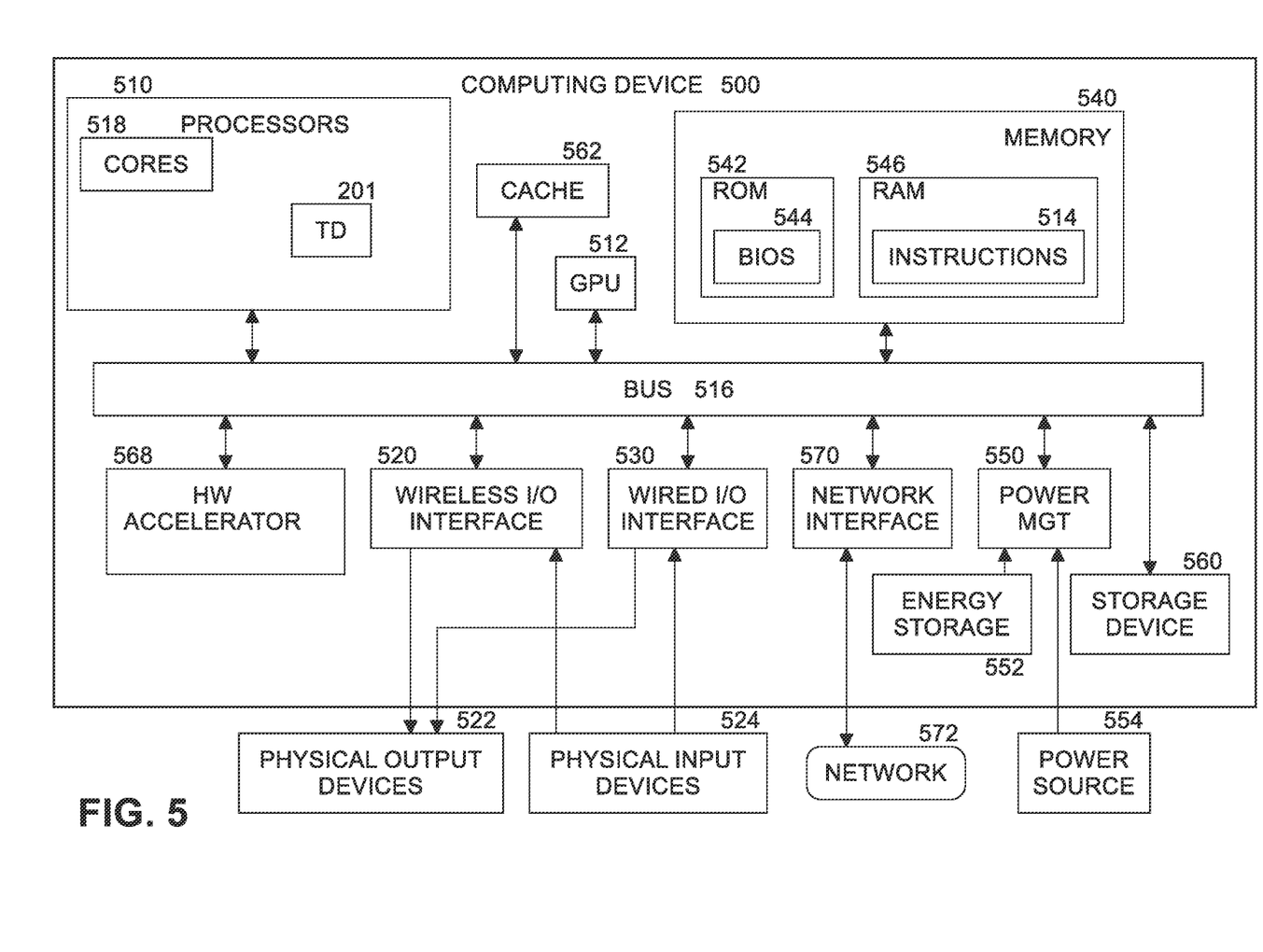
FIG. 5 is a schematic diagram of an illustrative electronic computing device to perform processing to provide multiple secure virtual processors according to some embodiments.

FIG. 5 is a schematic diagram of an illustrative electronic computing device to perform security processing according to some embodiments. In some embodiments, computing device 500 includes one or more processors 510 including one or more processor cores 518, and at least one TD 201. In some embodiments, the computing device 500 includes one or more hardware accelerators 568.

In some embodiments, the computing device is to implement security processing, as provided in FIGS. 1-3 above.

The computing device 500 may additionally include one or more of the following: cache 562, a graphical processing unit (GPU) 512 (which may be the hardware accelerator in some implementations), a wireless input/output (I/O) interface 520, a wired I/O interface 530, system memory 540, power management circuitry 580, non-transitory storage device 560, and a network interface 570 for connection to a network 572. The following discussion provides a brief, general description of the components forming the illustrative computing device 500. Example, non-limiting computing devices 500 may include a desktop computing device, blade server device, workstation, laptop computer, mobile phone, tablet computer, personal digital assistant, or similar device or system.

In embodiments, the processor cores 518 are capable of executing machine-readable instruction sets 514, reading data and/or machine-readable instruction sets 514 from one or more storage devices 560 and writing data to the one or more storage devices 560. Those skilled in the relevant art will appreciate that the illustrated embodiments as well as other embodiments may be practiced with other processor-based device configurations, including portable electronic or handheld electronic devices, for instance smartphones, portable computers, wearable computers, consumer electronics, personal computers ("PCs"), network PCs, minicomputers, server blades, mainframe computers, and the like. For example, machine-readable instruction sets 514 may include instructions to implement security processing, as provided in FIGS. 1-4.

The processor cores 518 may include any number of hardwired or configurable circuits, some or all of which may include programmable and/or configurable combinations of electronic components, semiconductor devices, and/or logic elements that are disposed partially or wholly in a PC, server, mobile phone, tablet computer, or other computing system capable of executing processor-readable instructions.

The computing device 500 includes a bus 516 or similar communications link that communicably couples and facilitates the exchange of information and/or data between various system components including the processor cores 518, the cache 562, the graphics processor circuitry 512, one or more wireless I/O interface 520, one or more wired I/O interfaces 530, one or more storage devices 560, and/or one or more network interfaces 570. The computing device 500 may be referred to in the singular herein, but this is not intended to limit the embodiments to a single computing device 500, since in certain embodiments, there may be more than one computing device 500 that incorporates, includes, or contains any number of communicably coupled, collocated, or remote networked circuits or devices.

The processor cores 518 may include any number, type, or combination of currently available or future developed devices capable of executing machine-readable instruction sets.

The processor cores 518 may include (or be coupled to) but are not limited to any current or future developed single- or multi-core processor or microprocessor, such as: on or more systems on a chip (SOCs); central processing units (CPUs); digital signal processors (DSPs); graphics processing units (GPUs); application-specific integrated circuits (ASICs), programmable logic units, field programmable gate arrays (FPGAs), and the like. Unless described otherwise, the construction and operation of the various blocks shown in FIG. 5 are of conventional design. Consequently, such blocks need not be described in further detail herein, as they will be understood by those skilled in the relevant art. The bus 516 that interconnects at least some of the components of the computing device 500 may employ any currently available or future developed serial or parallel bus structures or architectures.

The system memory 540 may include read-only memory ("ROM") 542 and random-access memory ("RAM") 546. A portion of the ROM 542 may be used to store or otherwise retain a basic input/output system ("BIOS") 544. The BIOS 544 provides basic functionality to the computing device 500, for example by causing the processor cores 518 to load and/or execute one or more machine-readable instruction sets 514. In embodiments, at least some of the one or more machine-readable instruction sets 514 cause at least a portion of the processor cores 518 to provide, create, produce, transition, and/or function as a dedicated, specific, and particular machine, for example a word processing machine, a digital image acquisition machine, a media playing machine, a gaming system, a communications device, a smartphone, a neural network, a machine learning model, or similar devices.

The computing device 500 may include at least one wireless input/output (I/O) interface 520. The at least one wireless I/O interface 520 may be communicably coupled to one or more physical output devices 522 (tactile devices, video displays, audio output devices, hardcopy output devices, etc.). The at least one wireless I/O interface 520 may communicably couple to one or more physical input devices 524 (pointing devices, touchscreens, keyboards, tactile devices, etc.). The at least one wireless I/O interface 520 may include any currently available or future developed wireless I/O interface. Example wireless I/O interfaces include, but are not limited to: BLUETOOTH®, near field communication (NFC), and similar.

The computing device 500 may include one or more wired input/output (I/O) interfaces 530. The at least one wired I/O interface 530 may be communicably coupled to one or more physical output devices 522 (tactile devices, video displays, audio output devices, hardcopy output devices, etc.). The at least one wired I/O interface 530 may be communicably coupled to one or more physical input devices 524 (pointing devices, touchscreens, keyboards, tactile devices, etc.). The wired I/O interface 530 may include any currently available or future developed I/O interface. Example wired I/O interfaces include but are not limited to universal serial bus (USB), IEEE 1394 ("FireWire"), and similar.

The computing device 500 may include one or more communicably coupled, non-transitory, storage devices 560. The storage devices 560 may include one or more hard disk drives (HDDs) and/or one or more solid-state storage devices (SSDs). The one or more storage devices 560 may include any current or future developed storage appliances, network storage devices, and/or systems. Non-limiting examples of such storage devices 560 may include, but are not limited to, any current or future developed non-transitory storage appliances or devices, such as one or more magnetic storage devices, one or more optical storage devices, one or more electro-resistive storage devices, one or more molecular storage devices, one or more quantum storage devices, or various combinations thereof. In some implementations, the one or more storage devices 560 may include one or more removable storage devices, such as one or more flash drives, flash memories, flash storage units, or similar appliances or devices capable of communicable coupling to and decoupling from the computing device 500.

The one or more storage devices 560 may include interfaces or controllers (not shown) communicatively coupling the respective storage device or system to the bus 516. The one or more storage devices 560 may store, retain, or otherwise contain machine-readable instruction sets, data structures, program modules, data stores, databases, logical structures, and/or other data useful to the processor cores 518 and/or graphics processor circuitry 512 and/or one or more applications executed on or by the processor cores 518 and/or graphics processor circuitry 512. In some instances, one or more data storage devices 560 may be communicably coupled to the processor cores 518, for example via the bus 516 or via one or more wired communications interfaces 530 (e.g., Universal Serial Bus or USB); one or more wireless communications interface 520 (e.g., Bluetooth®, Near Field Communication or NFC); and/or one or more network interfaces 570 (IEEE 802.3 or Ethernet, IEEE 802.11, or Wi-Fi®, etc.).

Machine-readable instruction sets 514 and other programs, applications, logic sets, and/or modules may be stored in whole or in part in the system memory 540. Such machine-readable instruction sets 514 may be transferred, in whole or in part, from the one or more storage devices 560. The machine-readable instruction sets 514 may be loaded, stored, or otherwise retained in system memory 540, in whole or in part, during execution by the processor cores 518 and/or graphics processor circuitry 512.

The computing device 500 may include power management circuitry 580 that controls one or more operational aspects of the energy storage device 582. In embodiments, the energy storage device 582 may include one or more primary (i.e., non-rechargeable) or secondary (i.e., rechargeable) batteries or similar energy storage devices. In embodiments, the energy storage device 582 may include one or more supercapacitors or ultracapacitors. In embodiments, the power management circuitry 580 may alter, adjust, or control the flow of energy from an external power source 584 to the energy storage device 582 and/or to the computing device 500. The external power source 584 may include, but is not limited to, a solar power system, a commercial electric grid, a portable generator, an external energy storage device, or any combination thereof.

For convenience, the processor cores 518, the graphics processor circuitry 512, the wireless I/O interface 520, the wired I/O interface 530, the storage device 560, and the network interface 570 are illustrated as communicatively coupled to each other via the bus 516, thereby providing connectivity between the above-described components. In alternative embodiments, the above-described components may be communicatively coupled in a different manner than illustrated in FIG. 5. For example, one or more of the above-described components may be directly coupled to other components, or may be coupled to each other, via one or more intermediary components (not shown). In another example, one or more of the above-described components may be integrated into the processor cores 518 and/or the graphics processor circuitry 512. In some embodiments, all or a portion of the bus 516 may be omitted and the components are coupled directly to each other using suitable wired or wireless connections.

Flow charts representative of example hardware logic, machine readable instructions, hardware implemented state machines, and/or any combination thereof for implementing computing device 500, for example, are shown in FIG. 4. The machine-readable instructions may be one or more executable programs or portion(s) of an executable program for execution by a computer processor such as the processor 510 shown in the example computing device 500 discussed above in connection with FIG. 5. The program may be embodied in software stored on a non-transitory computer readable storage medium such as a CD-ROM, a floppy disk, a hard drive, a DVD, a Blu-ray disk, or a memory associated with the processor 510, but the entire program and/or parts thereof could alternatively be executed by a device other than the processor 510 and/or embodied in firmware or dedicated hardware. Further, although the example program is described with reference to the flow charts illustrated in FIG. 4, many other methods of implementing the example computing device 500 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine-readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine-readable instructions may be fragmented and stored on one or more storage devices and/or computing devices (e.g., servers). The machine-readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine-readable instructions may be stored in multiple parts, which are individually compressed, encrypted, and stored on separate computing devices, wherein the parts when decrypted, decompressed, and combined form a set of executable instructions that implement a program such as that described herein.

In another example, the machine-readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine-readable instructions may be configured (e.g., settings stored, data input, network addresses recorded, etc.) before the machine-readable instructions and/or the corresponding program(s) can be executed in whole or in part. Thus, the disclosed machine-readable instructions and/or corresponding program(s) are intended to encompass such machine-readable instructions and/or program(s) regardless of the particular format or state of the machine-readable instructions and/or program(s) when stored or otherwise at rest or in transit.

The machine-readable instructions described herein can be represented by any past, present, or future instruction language, scripting language, programming language, etc. For example, the machine-readable instructions may be represented using any of the following languages: C, C++, Java, C #, Perl, Python, JavaScript, HyperText Markup Language (HTML), Structured Query Language (SQL), Swift, etc.

As mentioned above, the example processes of FIG. 3 may be implemented using executable instructions (e.g., computer and/or machine-readable instructions) stored on a non-transitory computer and/or machine-readable medium such as a hard disk drive, a solid-state storage device (SSD), a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended.

The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

The following examples pertain to further embodiments. Example 1 is a method including creating a virtual processor control structure (VPCS) for one or more of a plurality of virtual processors (VPs) of a trust domain (TD) of a processor in a computing system, the TD including a trust domain control structure (TDCS), the plurality of VPs having views into addresses of private memory of the TD, the VPCS for a VP including a secure extended page table (SEPT) for the VP; and for the VP, initializing the VPCS for the VP by copying selected entries of the TDCS to the SEPT of the VPCS, pointing a SEPT pointer to the VPCS, and setting an entry point for starting execution of the VP by the processor.

In Example 2, the subject matter of Example 1 can optionally include wherein the VPCS comprises a processor context of the VP.

In Example 3, the subject matter of Example 1 can optionally include wherein at least two VPs share a same view into the private memory of the TD by sharing a SEPT.

In Example 4, the subject matter of Example 1 can optionally include wherein at least two VPs share overlapping views into the private memory of the TD.

In Example 5, the subject matter of Example 1 can optionally include wherein at least two VPs have non-overlapping views into the private memory of the TD.

In Example 6, the subject matter of Example 1 can optionally include using the SEPT for the VP to translate a private guest physical address (GPA) into a physical address and a private key identifier for the TD.

In Example 7, the subject matter of Example 1 can optionally include wherein a VP has a view into at least one range of addresses of the private memory of the TD.

Example 8 is at least one non-transitory machine-readable storage medium comprising instructions that, when executed, cause at least one processing device to at least create a virtual processor control structure (VPCS) for one or more of a plurality of virtual processors (VPs) of a trust domain (TD) of a processor in a computing system, the TD including a trust domain control structure (TDCS), the plurality of VPs having views into addresses of private memory of the TD, the VPCS for a VP including a secure extended page table (SEPT) for the VP; and for the VP, initialize the VPCS for the VP by copying selected entries of the TDCS to the SEPT of the VPCS, pointing a SEPT pointer to the VPCS, and setting an entry point for starting execution of the VP by the processor.

In Example 9, the subject matter of Example 8 can optionally include, wherein the VPCS comprises a processor context of the VP.

In Example 10, the subject matter of Example 8 can optionally include wherein at least two VPs share a same view into the private memory of the TD by sharing a SEPT.

In Example 11, the subject matter of Example 8 can optionally include, wherein at least two VPs share overlapping views into the private memory of the TD.

In Example 12, the subject matter of Example 8 can optionally include wherein at least two VPs have non-overlapping views into the private memory of the TD.

In Example 13, the subject matter of Example 8 can optionally include instructions, when executed to use the SEPT for the VP to translate a private guest physical address (GPA) into a physical address and a private key identifier for the TD.

In Example 14, the subject matter of Example 8 can optionally include wherein a VP has a view into at least one range of addresses of the private memory of the TD.

Example 15 is an apparatus including a processor, and a memory coupled to the processor, the memory having instructions stored thereon that, in response to execution by the processor, cause the processor to create a virtual processor control structure (VPCS) for one or more of a plurality of virtual processors (VPs) of a trust domain (TD) of a processor in a computing system, the TD including a trust domain control structure (TDCS), the plurality of VPs having views into addresses of private memory of the TD, the VPCS for a VP including a secure extended page table (SEPT) for the VP; and for the VP, initialize the VPCS for the VP by copying selected entries of the TDCS to the SEPT of the VPCS, pointing a SEPT pointer to the VPCS, and setting an entry point for starting execution of the VP by the processor.

In Example 16, the subject matter of Example 15 can optionally include wherein the VPCS comprises a processor context of the VP.

In Example 17, the subject matter of Example 15 can optionally include wherein at least two VPs share a same view into the private memory of the TD by sharing a SEPT.

In Example 18, the subject matter of Example 15 can optionally include wherein at least two VPs share overlapping views into the private memory of the TD.

In Example 19, the subject matter of Example 15 can optionally include wherein at least two VPs have non-overlapping views into the private memory of the TD.

In Example 20, the subject matter of Example 15 can optionally include instructions, when executed to use the SEPT for the VP to translate a private guest physical address (GPA) into a physical address and a private key identifier for the TD.

In Example 21, the subject matter of Example 15 can optionally include wherein a VP has a view into at least one range of addresses of the private memory of the TD.

Example 22 is an apparatus including a processor, and a memory coupled to the processor, the processor including means for creating a virtual processor control structure (VPCS) for one or more of a plurality of virtual processors (VPs) of a trust domain (TD) of a processor in a computing system, the TD including a trust domain control structure (TDCS), the plurality of VPs having views into addresses of private memory of the TD, the VPCS for a VP including a secure extended page table (SEPT) for the VP; and for the VP, means for initializing the VPCS for the VP by copying selected entries of the TDCS to the SEPT of the VPCS, means for pointing a SEPT pointer to the VPCS, and means for setting an entry point for starting execution of the VP by the processor.

The foregoing description and drawings are to be regarded in an illustrative rather than a restrictive sense. Persons skilled in the art will understand that various modifications and changes may be made to the embodiments described herein without departing from the broader spirit and scope of the features set forth in the appended claims.

What is claimed is:

1. A method comprising:
generating, by a processor of a computing device, a trust domain control structure;
generating a virtual processor control structure associated with virtual processors relating to a trust domain associated with the processor, wherein the trust domain includes the trust domain control structure, and wherein the virtual processors having views into one or more addresses corresponding to a private memory associated with the trust domain, wherein two or more of the virtual processors to share the primary memory by sharing a secured table such that the two or more of the virtual processors to perform one or more operations that are distinct from other operations performed by other virtual processors; and
initializing the virtual processor control structure for the virtual processors by one or more of copying one or more selected entries associated with the trust domain control structure to the secured table, pointing a secured table pointer to the virtual processor control structure, or setting an entry point for initiating execution of the virtual processors by the processor.

2. The method of claim 1, wherein the virtual processor control structure comprises a processor context associated with the virtual processors.

3. The method of claim 1, further comprising translating, using the secured table associated with the virtual processors, a private guest physical address into a physical address and a private key identifier for the trust domain.

4. The method of claim 1, further comprising allowing the virtual processors to have a view into at least one range of addresses associated with the private memory associated with the trust domain, wherein the processor comprises one or more of an application processor or a graphics processor.

5. An apparatus comprising:
processor circuitry coupled to a memory, the processor circuitry to:
generate a trust domain control structure;
generate a virtual processor control structure associated with virtual processors relating to a trust domain associated with the processor, wherein the trust domain includes the trust domain control structure, and wherein the virtual processors having views into one or more addresses corresponding to a private memory associated with the trust domain, wherein two or more of the virtual processors to share the primary memory by sharing a secured table such that the two or more of the virtual processors to perform one or more operations that are distinct from other operations performed by other virtual processors; and
initialize the virtual processor control structure for the virtual processors by one or more of copying one or more selected entries associated with the trust domain control structure to a secured table, pointing a secured table pointer to the virtual processor control structure, or setting an entry point for initiating execution of the virtual processors by the processor.

6. The apparatus of claim 5, wherein the virtual processor control structure comprises a processor context associated with the virtual processors.

7. The apparatus of claim 5, wherein the processor circuitry is further to translate, using the secured table associated with the virtual processors, a private guest physical address into a physical address and a private key identifier for the trust domain.

8. The apparatus of claim 5, wherein the processor circuitry is further to allow the virtual processors to have a view into at least one range of addresses associated with the private memory associated with the trust domain, wherein the processor circuitry comprises one or more of application processor circuitry or graphics processor circuitry.

9. At least one non-transitory computer-readable medium having stored thereon instructions which, when executed, cause a computing device to perform operations comprising:
generating a trust domain control structure;
generating a virtual processor control structure associated with virtual processors relating to a trust domain associated with a processor of the computing device, wherein the trust domain includes the trust domain control structure, and wherein the virtual processors having views into one or more addresses corresponding to a private memory associated with the trust domain, wherein two or more of the virtual processors to share the primary memory by sharing a secured table such that the two or more of the virtual processors to perform one or more operations that are distinct from other operations performed by other virtual processors; and
initializing the virtual processor control structure for the virtual processors by one or more of copying one or more selected entries associated with the trust domain control structure to a secured table, pointing a secured table pointer to the virtual processor control structure, or setting an entry point for initiating execution of the virtual processors by the processor.

10. The non-transitory computer-readable medium of claim 9, wherein the virtual processor control structure comprises a processor context associated with the virtual processors.

11. The non-transitory computer-readable medium of claim 9, wherein two or more virtual processors share a common view into the private memory associated with the trust domain by sharing the secured table.

12. The non-transitory computer-readable medium of claim 9, wherein the operations further comprise translating, using the secured table associated with the virtual processors, a private guest physical address into a physical address and a private key identifier for the trust domain.

13. The non-transitory computer-readable medium of claim 9, wherein the operations further comprise allowing the virtual processors to have a view into at least one range of addresses associated with the private memory associated with the trust domain, wherein the processor comprises one or more of an application processor or a graphics processor.

\* \* \* \* \*